United States Patent
Rainville

(10) Patent No.: US 11,866,169 B2
(45) Date of Patent: Jan. 9, 2024

(54) SYSTEM AND METHOD FOR SUPPLYING PASSIVELY FILTERED RAM AIR TO A HYDROGEN FUEL CELL OF A UAV

(71) Applicant: Bell Textron Inc., Fort Worth, TX (US)

(72) Inventor: Joseph Dean Rainville, Fort Worth, TX (US)

(73) Assignee: Textron Innovations Inc., Providence, RI (US)

(*) Notice: Subject to any disclaimer, the term of this patent is extended or adjusted under 35 U.S.C. 154(b) by 554 days.

(21) Appl. No.: 16/988,375

(22) Filed: Aug. 7, 2020

(65) Prior Publication Data
US 2022/0041263 A1 Feb. 10, 2022

(51) Int. Cl.
| | |
|---|---|
| B64C 7/02 | (2006.01) |
| B64C 39/02 | (2023.01) |
| H01M 8/0267 | (2016.01) |
| H01M 8/04014 | (2016.01) |
| B64U 50/19 | (2023.01) |

(52) U.S. Cl.
CPC .............. B64C 7/02 (2013.01); B64C 39/024 (2013.01); H01M 8/0267 (2013.01); H01M 8/04014 (2013.01); *B64U 50/19* (2023.01); *H01M 2250/20* (2013.01)

(58) Field of Classification Search
CPC ........... H01M 8/0267; H01M 8/04014; H01M 2250/20; B64C 7/02; B64C 39/024; B64U 50/19; B64U 10/14
USPC ........................................................ 429/410
See application file for complete search history.

(56) References Cited

U.S. PATENT DOCUMENTS

| | | | |
|---|---|---|---|
| 7,069,893 B2 | 7/2006 | Cusumano et al. | |
| 7,938,213 B2 | 5/2011 | Khouw | |
| 8,927,169 B2 | 1/2015 | Yumiya | |
| 2007/0087240 A1* | 4/2007 | Robin | H01M 8/04089 429/410 |
| 2010/0151294 A1* | 6/2010 | Rainville | H01M 8/04201 429/444 |
| 2017/0110744 A1 | 4/2017 | Mito et al. | |
| 2017/0240291 A1 | 8/2017 | Kim | |
| 2017/0331131 A1* | 11/2017 | Rheaume | A62C 3/08 |
| 2018/0273194 A1* | 9/2018 | Edgar | B64D 27/24 |
| 2019/0181479 A1 | 6/2019 | Ichikawa et al. | |
| 2019/0217959 A1* | 7/2019 | Xie | B01D 45/08 |
| 2019/0329899 A1 | 10/2019 | Edler et al. | |
| 2020/0172251 A1* | 6/2020 | Beckman | B01D 46/72 |
| 2020/0388865 A1* | 12/2020 | Rainville | H01M 8/04253 |

FOREIGN PATENT DOCUMENTS

| | | |
|---|---|---|
| DE | 102015015715 A1 | 6/2017 |
| JP | 2006085970 A | 3/2006 |
| JP | 5741485 B2 | 7/2015 |

* cited by examiner

*Primary Examiner* — James M Erwin
(74) *Attorney, Agent, or Firm* — Lightfoot & Alford PLLC

(57) ABSTRACT

An unmanned aerial vehicle (UAV) has an air-cooled fuel cell, an air channel comprising a forward facing opening for receiving ram air and connected to the air-cooled fuel cell, and a passive ram air filtration system (PRAFS) configured to filter particulate matter from ram air received into the air channel via the opening.

13 Claims, 5 Drawing Sheets

SYSTEM AND METHOD FOR SUPPLYING PASSIVELY FILTERED RAM AIR TO A HYDROGEN FUEL CELL OF A UAV

BACKGROUND

Unmanned aerial vehicles ("UAVs"), or drones, are usually battery powered and are therefore limited in range by battery life. Hydrogen fuel cells are being considered as an option to extend range and flight time of UAVs. Fuel cells operate by allowing an electrochemical reaction between hydrogen and oxygen, which produces electrical energy and water. In most fuel cell powered vehicles, hydrogen fuel, stored in an onboard hydrogen fuel tank, is supplied to an anode of the fuel cell and ambient air is supplied to a cathode of the fuel cell. The electrical energy produced drives a motor and the water is disposed of. The hydrogen fuel tanks are often externally coupled to the UAV or may be housed internally within a nacelle, such as described in U.S. patent application Ser. No. 16/290,704, filed Mar. 1, 2019, which is incorporated herein in by reference in its entirety. Hydrogen tanks and fuel cells, along with the electronics they power, are complex devices that may be difficult to repair at an operating location.

UAVs come in many different configurations. For example, a UAV may be configured as a conventional takeoff and landing (CTOL) aircraft or a vertical takeoff and landing (VTOL) aircraft. A CTOL aircraft generates lift in response to the forward airspeed of the aircraft. The forward airspeed is typically generated by thrust from one or more propellers. Accordingly, CTOL aircraft typically require a long runway for takeoff and landing to accommodate the acceleration and deceleration required to provide the desired lift. Unlike CTOL aircraft, VTOL aircraft do not require runways. Instead, VTOL aircraft are capable of taking off, hovering and landing vertically. One example of VTOL aircraft is a helicopter which includes one or more rotors that provide lift and thrust to the aircraft. The rotors not only enable hovering and vertical takeoff and landing, but also enable forward, backward, and lateral flight. These attributes make helicopters highly versatile for use in congested, isolated, or remote areas where CTOL aircraft may be unable to take off and land. Helicopters, however, typically lack the forward airspeed and range of CTOL aircraft. Other examples of VTOL aircraft include tiltrotor aircraft and tiltwing aircraft. Both of which attempt to combine the benefits of a VTOL aircraft with the forward airspeed and range of a CTOL aircraft. Tiltrotor aircraft typically utilize a pair of nacelles rotatably coupled to a fixed wing. Each nacelle includes a proprotor extending therefrom, wherein the proprotor acts as a helicopter rotor when the nacelle is in a vertical position and a fixed-wing propeller when the nacelle is in a horizontal position. A tiltwing aircraft utilizes a rotatable wing that is generally horizontal for forward flight and rotates to a generally vertical orientation for vertical takeoff and landing. Propellers are coupled to the rotating wing to provide the required vertical thrust for takeoff and landing and the required forward thrust to generate lift from the wing during forward flight.

Yet another example of a VTOL aircraft is a tailsitter aircraft. Tailsitter aircraft, such as those disclosed in U.S. patent application Ser. No. 16/154,326, filed Oct. 8, 2018 and U.S. patent application Ser. No. 15/606,242, filed May 26, 2017, both of which are incorporated herein by reference in their entireties, attempt to combine the benefits of a VTOL aircraft with the forward airspeed and range of a CTOL aircraft by rotating the entire aircraft from a vertical orientation for takeoff, landing, hovering, and low-speed horizontal movement, to a horizontal orientation for high speed and long-range flight.

BRIEF DESCRIPTION OF THE DRAWINGS

Prior Art

DETAILED DESCRIPTION

While the making and using of various embodiments of this disclosure are discussed in detail below, it should be appreciated that this disclosure provides many applicable inventive concepts, which can be embodied in a wide variety of specific contexts. The specific embodiments discussed herein are merely illustrative and do not limit the scope of this disclosure. In the interest of clarity, not all features of an actual implementation may be described in this disclosure. It will of course be appreciated that in the development of any such actual embodiment, numerous implementation-specific decisions must be made to achieve the developer's specific goals, such as compliance with system-related and business-related constraints, which will vary from one implementation to another.

In this disclosure, reference may be made to the spatial relationships between various components and to the spatial orientation of various aspects of components as the devices are depicted in the attached drawings. However, as will be recognized by those skilled in the art after a complete reading of this disclosure, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction. In addition, the use of the term "coupled" throughout this disclosure may mean directly or indirectly connected, moreover, "coupled" may also mean permanently or removably connected, unless otherwise stated.

This disclosure divulges a UAV comprising a fuel cell that is at least partially air-cooled and/or sources its cathode reactant air from a ram air duct. In the least, this disclosure enables a UAV that is powered by a fuel cell that is at least partially passively cooled by passing some ram air through a portion the fuel cell and other ram air through a bleed port so that entrained particulate matter is filtered from the ram air and directed away from the fuel cell. In other embodiments, ram air can likewise be directed through a fuel cell but only after passing through an electrostatic filter. In yet another embodiment disclosed, some ram air may be passed through an electrostatic filter before entering a fuel cell and some of the ram air can be diverted through a bleed port to take particulate matter away from the fuel cell. While the aircraft shown and discussed herein is depicted as a UAV, it should be understood that it may comprise any type of aircraft. Moreover, the systems and methods disclosed herein can be used on any vehicle or device that carries an air-cooled fuel cell and can be supplied ram air.

Figure 1:
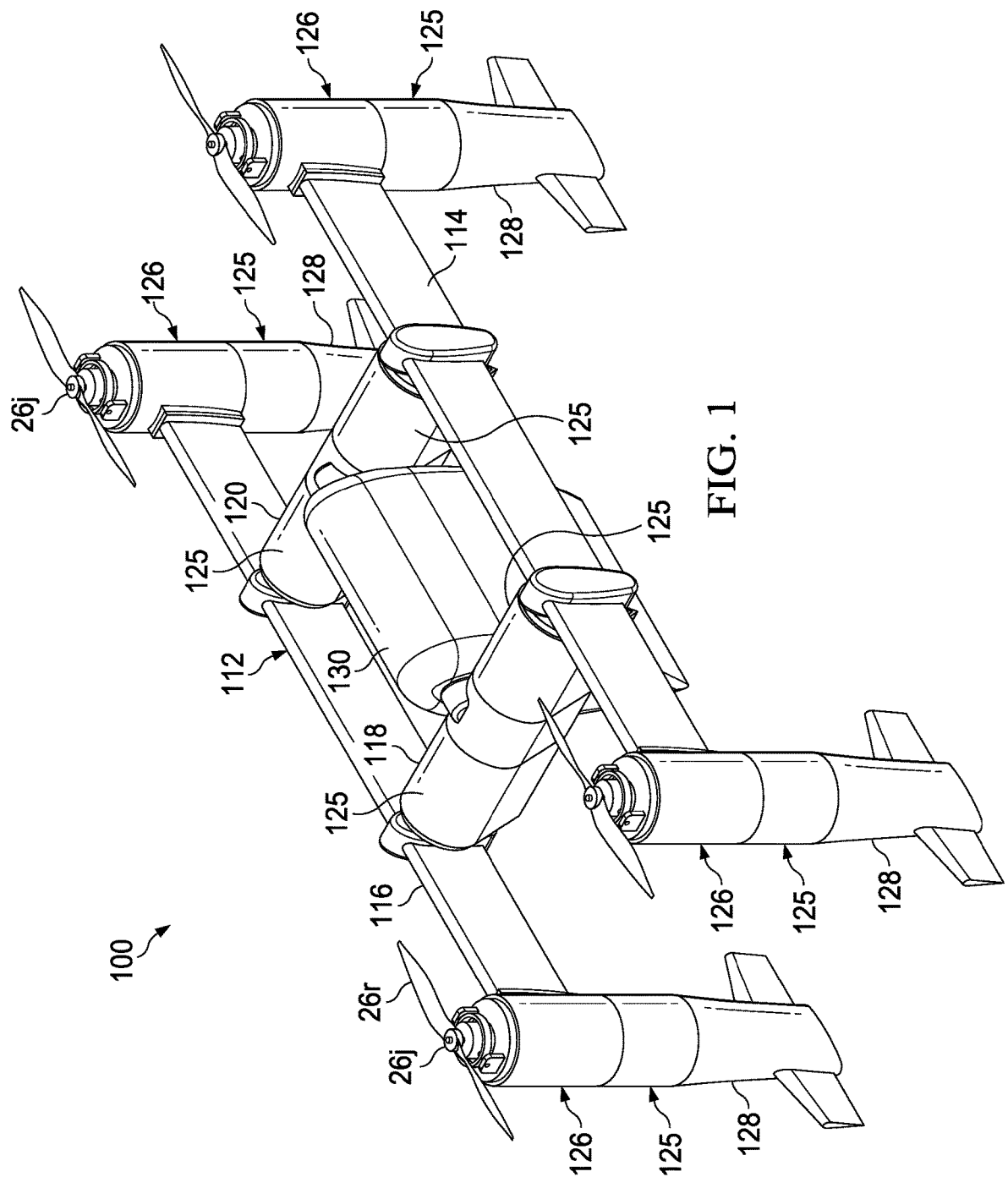
FIG. 1 is an oblique view of an unmanned aerial vehicle (UAV) according to and embodiment of this disclosure.

Referring to FIG. 1, a tailsitter UAV 100, operable to transition between thrust-borne lift in a VTOL orientation and wing-borne lift in a biplane orientation, are depicted. In the VTOL orientation, thrust modules 126 provide thrust-borne lift. In the biplane orientation, the thrust modules 126 provide forward thrust and the forward airspeed of UAV 100 provides wing-borne lift, enabling UAV 100 to have a high speed and/or high endurance forward-flight mode.

UAV 100 is a mission-configurable aircraft operable to provide high-efficiency transportation for diverse payloads. Based upon mission parameters, including flight parameters such as environmental conditions, speed, range, and thrust requirements, as well as payload parameters such as size, shape, weight, type, durability, and the like, UAV 100 may selectively incorporate a variety of thrust modules having different characteristics and/or capacities. For example, the thrust modules operable for use with UAV 100 may have different thrust types including different maximum thrust outputs and/or different thrust vectoring capabilities including non-thrust vectoring thrust modules, single-axis thrust vectoring thrust modules such as longitudinal thrust vectoring thrust modules and/or lateral thrust vectoring thrust modules, and two-axis thrust vectoring thrust modules which may also be referred to as omnidirectional thrust vectoring thrust modules. In addition, various components of each thrust module may be selectable including the power plant configuration and the rotor design. For example, the type or capacity of the fuel cell system in a thrust module may be selected based upon the power, weight, endurance, altitude, and/or temperature requirements of a mission. Likewise, the characteristics of the rotor assemblies may be selected, such as the number of rotor blades, the blade pitch, the blade twist, the rotor diameter, the chord distribution, the blade material, and the like.

In the illustrated embodiment, UAV 100 includes an airframe 112 including wings 140 and 160 each having an airfoil cross-section that generates lift responsive to the forward airspeed of UAV 100 when in the biplane orientation. Wings 140 and 160 may be formed as single members or may be formed from multiple wing sections. The outer skins of wings 140 and 160 are preferably formed from high strength and lightweight materials such as fiberglass, carbon fiber, plastic, aluminum, and/or another suitable material or combination of materials. As illustrated, wings 140 and 160 are straight wings. In other embodiments, wings 140 and 160 could have other designs such as polyhedral wing designs, swept wing designs, or another suitable wing design.

Extending generally perpendicularly between wings 140 and 160 are two truss structures depicted as pylons 118 and 120 that can comprise and/or carry tanks 125 for carrying fuel, such as, but not limited to, gaseous hydrogen for powering a fuel cell 26d.

Wings 140 and 160 and pylons 118 and 120 preferably include passageways operable to contain flight control systems, energy sources, communication lines and/or other desired systems. In the illustrated embodiment, thrust modules 126 are fixed pitch, variable speed, omnidirectional thrust vectoring thrust modules.

As illustrated, thrust modules 126 are coupled to the outboard ends of wings 140 and 160. While not shown, additional thrust modules 126 may be coupled to central portions of wings 140 and 160. Thrust modules 126 are independently attachable to and detachable from airframe 112 such that UAV 100 may be part of a man-portable aircraft system having component parts with connection features designed to enable rapid assembly/disassembly of UAV 100. Alternatively, or additionally, the various components of UAV 100.

Figure 2:
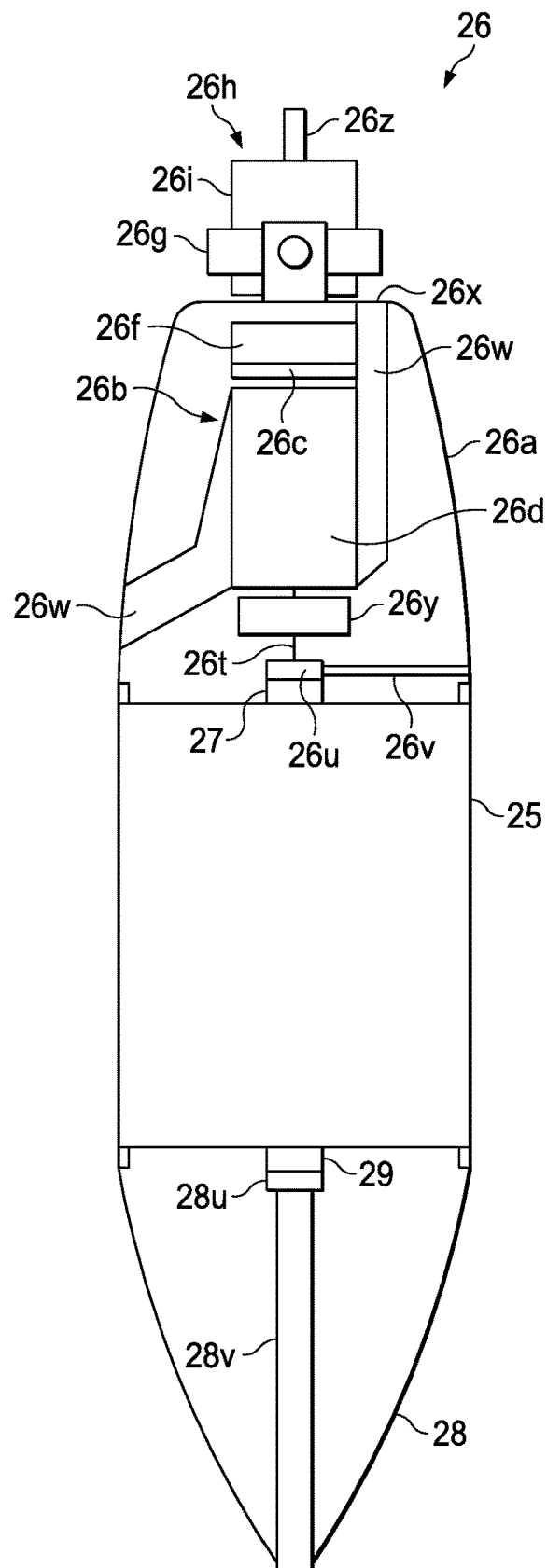
FIG. 2 shows a prior art thrust module.

Referring now to Prior Art FIG. 2, a prior art thrust module 26 for use in a UAV substantially similar to UAV 100 is shown to include a nacelle 26a that houses components including a fuel cell system 26b, an electronic speed controller 26c, gimbal actuators (not shown), an electronics node 26f, sensors, and other desired electronic equipment. Nacelle 26a also supports a two-axis gimbal 26g and a propulsion system 26h depicted as an electric motor 26i and a rotor assembly 26j (not shown). As the power for each thrust module 26 is provided by fuel cell system 26b, housed within respective nacelles 26a, UAVs such as UAV 100 can have a distributed power system for a distributed thrust array. In this embodiment, electrical power may be supplied to any electric motor 26i, electronic speed controller 26c, electronics node 26f, gimbal actuators, flight control system, sensor, and/or other desired equipment from any fuel cell system 26b. Fuel cell system 26b is configured to produce electrical energy from an electrochemical reaction between hydrogen and oxygen. Fuel cell system 26b includes a fuel cell 26d which includes a cathode configured to receive oxygen from the ambient air, an anode configured to receive hydrogen fuel, and an electrolyte between the anode and the cathode that allows positively charged ions to move between the anode and the cathode. While fuel cell 26d is described in the singular, it should be understood that fuel cell 26d may include a fuel cell stack comprising a plurality of fuel cells in series or parallel to increase the output thereof. Fuel cell system 26b receives hydrogen fuel from fuel tank 25. Hydrogen fuel is delivered from fuel tank 25 to the anode of fuel cell 26d through a supply line 26t coupled to a pressure regulator 26u, which is coupled to stem 27 of tank 25. Pressure regulator 26u is configured to reduce the pressure of the hydrogen fuel from fuel tank 25 to a desired pressure in supply line 26t that is suitable for use at the anode of fuel cell 26d. Pressure regulator 26u may also have a filling port 26v coupled thereto. Filling port 26v is configured to enable refilling of fuel tank 25 without uncoupling tank 25 from nacelle 26a. Filling port 26v may allow for autonomous refilling of tank 25 when a UAV such as UAV 100 lands on a landing pad configured for the same. Alternatively, or additionally, thrust module 26 may include a pressure regulator 28u coupled to a stem 29 of tank 25, and a filling port 28v coupled to pressure regulator 28u. Filling port 28v extends from pressure regulator 28u to the exterior surface of tail section 28, thereby enabling refilling of tank 25 without uncoupling tank 25 from a tail section such as tail section 28.

Oxygen from the ambient air is delivered to the cathode of fuel cell 26d via an air channel 26w. Air channel 26w may serve two functions, supplying oxygen to the cathode and cooling fuel cell 26d. As such, air channel 26w is configured to direct air from outside of nacelle 26a to the cathode of fuel cell 26d and/or to a heat transfer surface of fuel cell 26d. The heat transfer surface of fuel cell 26d may comprise a heat exchanger or any surface configured to enhance heat removal therefrom. Moreover, when fuel cell 26d is an open-cathode air-cooled unit, the airflow delivered to the cathode by air channel 26w may serve as both the cathode reactant supply and cooling air. That is, air ducted to a single location may deliver oxygen to the cathode and cool fuel cell 26d. Air channel 26w includes a forward-facing opening 26x positioned behind rotor assembly 26j such that ram air and propeller wash is driven through air channel 26w by rotating rotor blades 26*r*. This is particularly helpful when a UAV such as UAV 100 is operating in the VTOL orientation, as it insures sufficient airflow for oxygen supply and/or cooling purposes. Fuel cell system 26*b* further includes an electrical energy storage device 26*y* configured to store and release the electrical energy produced by fuel cell 26*d*. Electrical energy storage device may comprise a battery, a supercapacitor, or any other device capable of storing and releasing electrical energy. Alternatively, the electrical energy produced by fuel cell 26*d* may be directly supplied to the electrical components.

Operation of fuel cell system 26*b* is controlled by electronics node 26*f*. Electronics node 26*f* preferably includes non-transitory computer readable storage media including a set of computer instructions executable by one or more processors for controlling the operation of thrust module 26. These operations may include valve and solenoid operations to adjust the flow of hydrogen fuel from supply line 26*t* to the anode, battery management, directing electrical energy distribution, voltage monitoring of fuel cell 26*d*, current monitoring for fuel cell 26*d* and electrical energy storage device 26*y*, etc.

Referring back to FIG. 1, because forward flight of UAV 100 in the biplane orientation utilizing wing-borne lift requires significantly less power than VTOL flight utilizing thrust-borne lift, the operating speed of some or all of thrust modules 126 may be reduced. In certain embodiments, some of the thrust modules 126 could be shut down during forward flight. While UAV 100 may be reconfigured with different numbers or types of thrust modules 126 to satisfy different flight requirements, UAV 100 may also be configured to allow fuel cell system 26*b* to switch between operating on oxygen from ambient air and operating on oxygen provided by an on board oxygen tank such as the system disclosed in U.S. patent application Ser. No. 16/214,735, filed on Dec. 10, 2018, which is incorporated herein by reference in its entirety. Operating a fuel cell on oxygen, rather than air, can increase the power produced by the fuel cell, at sea level, by 15 to 20 percent. As such, the increased power of the oxygen mode may be used in the VTOL orientation and air mode may be used in the biplane orientation. It may be desirable for UAVs such as UAV 100 to have an oxygen tank that is remote from the thrust modules. Accordingly, a remote oxygen tank may be located anywhere on UAV 100, for example, one or more of tanks 125 may be configured to store and distribute pressurized oxygen to thrust modules 126 when needed. In this configuration, UAV 100 includes a supply line coupled between the remote oxygen tank and the cathode of fuel cell 26*d*. The supply line may be uninterrupted between the remote oxygen tank and the cathode, which would require a user to manually attached the supply line to the cathode when coupling thrust module 126 to UAV 100. Alternatively, the thrust module 126 and UAV 100 may include complimentary rapid connection interfaces that include not only electrical and mechanical connections, but also include gaseous connections for automated, or quick-connection, of separate portions of the supply line. The connections between wings 140 and 160, pylons 118 and 120, thrust modules 126, and payload 130 of UAV 100 are each operable for rapid on-site assembly through the use of high-speed fastening elements.

Figure 3:
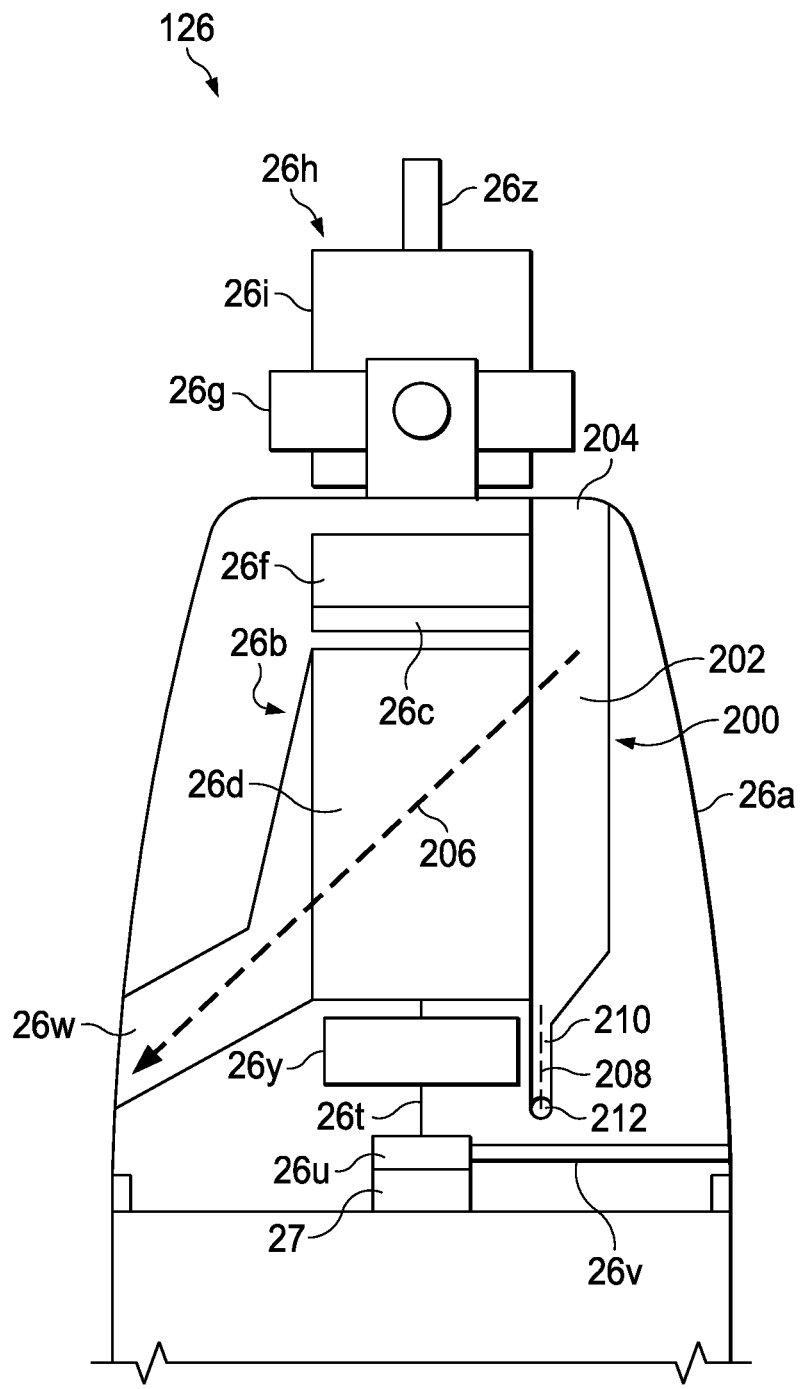
FIG. 3 shows a thrust module of the UAV of FIG. 1.

Referring now to FIG. 3, thrust module 126 is shown. Thrust module 126 is substantially similar to thrust module 26, but comprises a passive ram air filtration system (PRAFS) 200. PRAFS 200 comprises an air channel 202 through which oxygen from the ambient ram air is delivered to the cathode of fuel cell 26*d*. Air channel 202 can serve two functions, supplying oxygen to the cathode and cooling fuel cell 26*d*. As such, air channel 26*w* is configured to direct air from outside of nacelle 26*a* to the cathode of fuel cell 26*d* and/or to a heat transfer surface of fuel cell 26*d*. The heat transfer surface of fuel cell 26*d* may comprise a heat exchanger or any surface configured to enhance heat removal therefrom. Moreover, when fuel cell 26*d* is an open-cathode air-cooled unit, the ram airflow delivered to the cathode by air channel 202 may serve as both the cathode reactant supply and cooling air. That is, ram air ducted via air channel 202 can deliver fuel oxygen to the cathode as well as cool fuel cell 26*d*. Air channel 202 includes a forward-facing opening 204 positioned behind rotor assembly 26*j* such that ram air and propeller wash is driven through air channel 202 by movement of the UAV 100 in a gaseous environment such as ambient air and from propeller wash of rotating rotor blades 26*r*. As compared to air channel 26*w*, air channel 202 can be relatively larger and/or can comprise a relatively larger forward-facing opening 204 (as compared to forward-facing opening 26*x*). In this embodiment, ram air entering air channel 202 via air channel 202 can be delivered to at least two different paths, namely, a fuel cell path 206 (substantially similar to operation of thrust module 26) and an entrainment path 208. Entrainment path 208 includes passage through an entrainment air channel 210 that connects air channel 202 to an entrainment air exit 212. In this embodiment, entrainment air channel 210 is configured to direct some of the air entering air channel 202 via opening 204 out of thrust module 126 via a path other than through fuel cell 26*d*. In this embodiment, the entrainment path 208 connects air channel 202 to the environment external to the thrust module 126. In this embodiment, both the air channel 202 and the entrainment air channel 210 are sized, provided shape profiles, and otherwise configured to generate a particulate matter separation force on particulate matter that enters air channel 202. The particulate matter separation force generally urges particulate matter (such as matter that is undesirable for passage through fuel cell 26*d*) along entrainment path 208 that leads from air channel 202 to entrainment air exit 212 via entrainment air channel 210. In this embodiment, the air exiting thrust module 126 via entrainment air exit 212 occurs at a significantly lower mass flow rate as compared to the mass flow rate of air exiting thrust module via fuel cell 26*d*. Entrainment air channel 210 and/or portions of air channel 202 can be configured to utilize funnel-like profiles, nozzle-like profiles, vortex-inducing profiles, and/or any other suitable shape to force particulate matter away from the fuel cell path 206 and toward and/or into the entrainment path 208. In this embodiment, passively received ram air is utilized to direct particulate matter away from fuel cell 26*d*, thereby providing a passively achieved filtration of the ram air entering thrust module 126.

Figure 4:
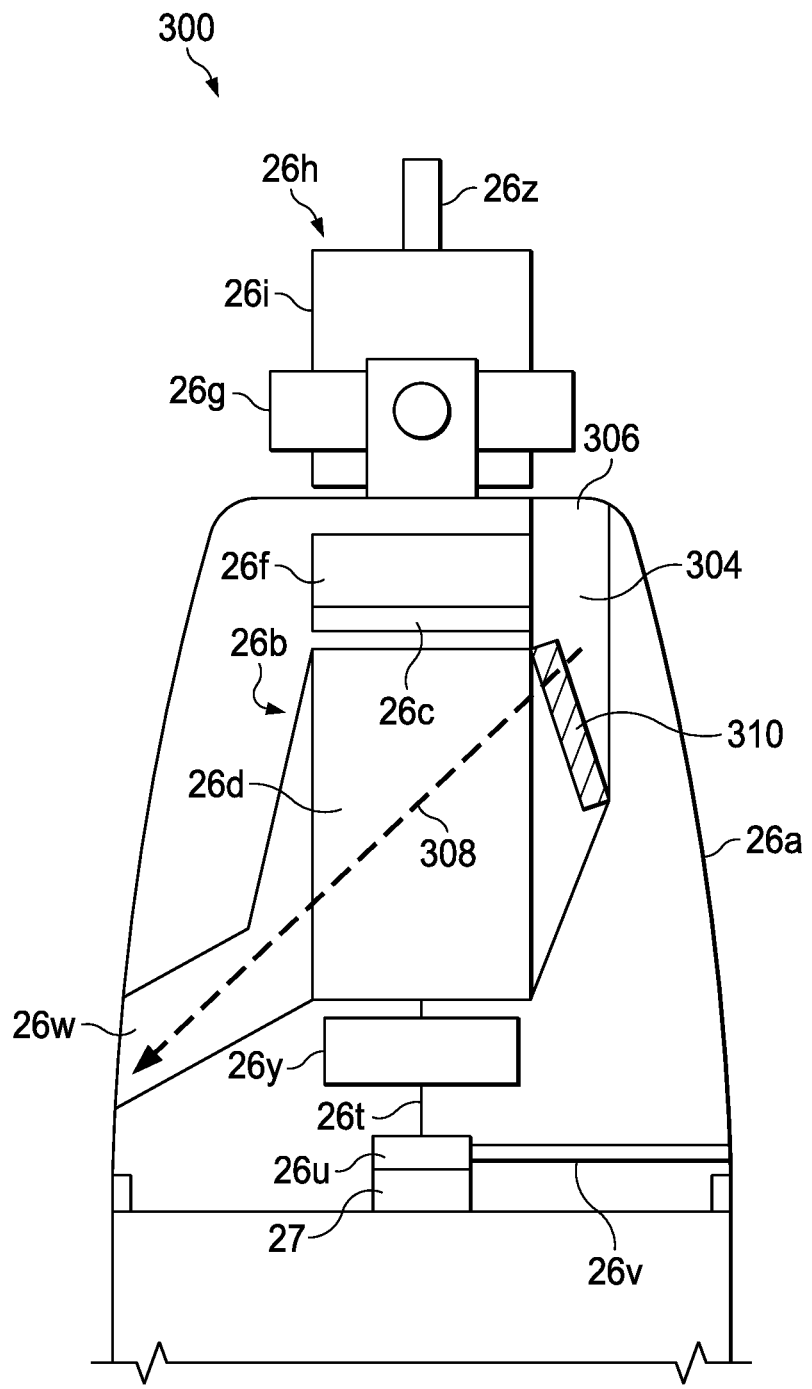
FIG. 4 shows an alternative embodiment of a thrust module for use in the UAV of FIG. 1.

Referring now to FIG. 4, an alternative embodiment of a thrust module 300 is shown. Thrust module 300 is substantially similar to thrust module 126, but further comprises a passive ram air filtration system (PRAFS) 302. PRAFS 302 comprises an air channel 304 through which oxygen from the ambient ram air is delivered to the cathode of fuel cell 26*d*. Air channel 304 can serve two functions, supplying oxygen to the cathode and cooling fuel cell 26*d*. As such, air channel 26*w* is configured to direct air from outside of nacelle 26*a* to the cathode of fuel cell 26*d* and/or to a heat transfer surface of fuel cell 26*d*. The heat transfer surface of fuel cell 26*d* may comprise a heat exchanger or any surface configured to enhance heat removal therefrom. Moreover, when fuel cell 26*d* is an open-cathode air-cooled unit, the ram airflow delivered to the cathode by air channel 304 may serve as both the cathode reactant supply and cooling air. That is, ram air ducted via air channel 304 can deliver fuel oxygen to the cathode as well as cool fuel cell 26d. Air channel 304 includes a forward-facing opening 306 positioned behind rotor assembly 26j such that ram air and propeller wash is driven through air channel 304 by movement of a UAV such as UAV 100 in a gaseous environment such as ambient air and from propeller wash of rotating rotor blades 26r. As compared to air channel 26w, air channel 304 can be relatively larger and/or can comprise a relatively larger forward-facing opening 306 (as compared to forward-facing opening 26x). In this embodiment, ram air entering air channel 304 via opening 306 can be delivered to fuel cell 26d along a fuel cell path 308 (substantially similar to operation of thrust module 26) that passes through an electrostatic filter 310. Electrostatic filter 310 is configured to capture particulate matter in the ram air, thereby preventing the particulate matter from entering fuel cell 26d.

Figure 5:
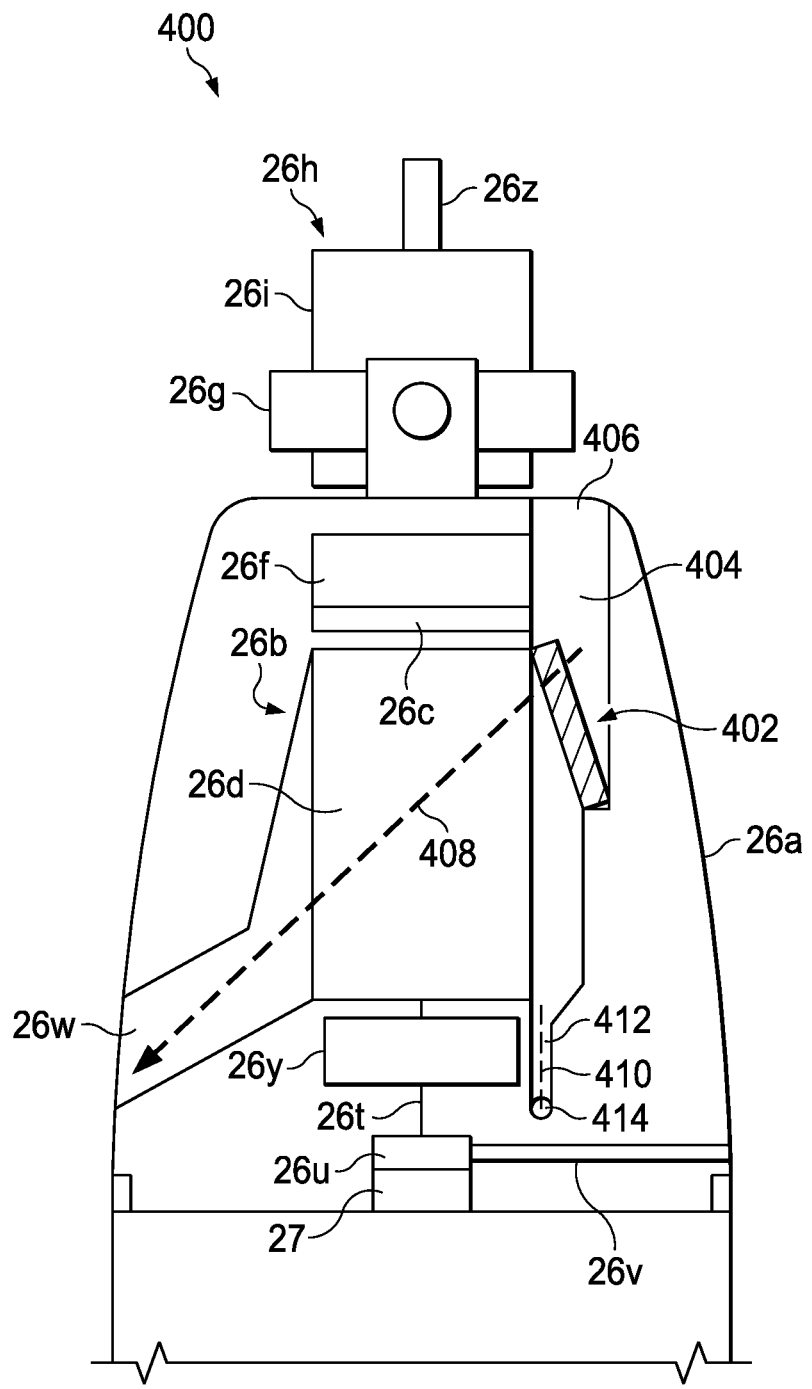
FIG. 5 shows another alternative embodiment of a thrust module for use in the UAV of FIG. 1.

Referring now to FIG. 5, an alternative embodiment of a thrust module 400 is shown. Thrust module 400 is substantially similar to thrust module 26, but comprises a passive ram air filtration system (PRAFS) 402. PRAFS 402 comprises an air channel 404 through which oxygen from the ambient ram air is delivered to the cathode of fuel cell 26d. Air channel 404 can serve two functions, supplying oxygen to the cathode and cooling fuel cell 26d. As such, air channel 26w is configured to direct air from outside of nacelle 26a to the cathode of fuel cell 26d and/or to a heat transfer surface of fuel cell 26d. The heat transfer surface of fuel cell 26d may comprise a heat exchanger or any surface configured to enhance heat removal therefrom. Moreover, when fuel cell 26d is an open-cathode air-cooled unit, the ram airflow delivered to the cathode by air channel 404 may serve as both the cathode reactant supply and cooling air. That is, ram air ducted via air channel 404 can deliver fuel oxygen to the cathode as well as cool fuel cell 26d. Air channel 404 includes a forward-facing opening 406 positioned behind rotor assembly 26j such that ram air and propeller wash is driven through air channel 404 by movement of a UAV such as UAV 100 in a gaseous environment such as ambient air and from propeller wash of rotating rotor blades 26r. As compared to air channel 26w, air channel 404 can be relatively larger and/or can comprise a relatively larger forward-facing opening 406 (as compared to forward-facing opening 26x). In this embodiment, ram air entering air channel 404 via opening 406 can be delivered to at least two different paths, namely, a fuel cell path 408 (substantially similar to operation of thrust module 26) and an entrainment path 410. Entrainment path 410 includes passage through an entrainment air channel 412 that connects air channel 404 to an entrainment air exit 414. In this embodiment, entrainment air channel 412 is configured to direct some of the air entering air channel 404 via opening 406 out of thrust module 400 via a path other than through fuel cell 26d. In this embodiment, the entrainment path 410 connects air channel 404 to the environment external to the thrust module 400. In this embodiment, both the air channel 404 and the entrainment air channel 412 are sized, provided shape profiles, and otherwise configured to generate a particulate matter separation force on particulate matter that enters air channel 404. The particulate matter separation force generally urges particulate matter (such as matter that is undesirable for passage through fuel cell 26d) along entrainment path 410 that leads from air channel 404 to entrainment air exit 414 via entrainment air channel 412. In this embodiment, the air exiting thrust module 400 via entrainment air exit 414 occurs at a significantly lower mass flow rate as compared to the mass flow rate of air exiting thrust module via fuel cell 26d. Entrainment air channel 412 and/or portions of air channel 404 can be configured to utilize funnel-like profiles, nozzle-like profiles, vortex-inducing profiles, and/or any other suitable shape to force particulate matter away from the fuel cell path 408 and toward and/or into the entrainment path 410. In this embodiment, passively received ram air is utilized to direct particulate matter away from fuel cell 26d, thereby providing a passively achieved filtration of the ram air entering thrust module 400. While this embodiment is substantially similar to thrust module 126, thrust module 400 further comprises an electrostatic filter 416 disposed within air channel 404 so that ram air entering air channel 404 cannot reach either of fuel cell 26d or entrainment path 410 without first passing through electrostatic filter 416. Accordingly, this embodiment provides two passive features for filtering particulate matter from ram air and thereby preventing the filtered particulate matter from entering fuel cell 26d.

While the embodiments described above discuss PRAFSs used in conjunction with air-cooled fuel cells, the same PRAFSs can alternatively be used in conjunction with open cathode hydrogen fuel cells. Utilizing the passive filtration of the PRAFSs disclosed herein can reduce cathode catalyst contamination and enhance the durability of the fuel cell stack. In some embodiments, geometry can be added to the air ducts to accomplish basic levels of filtration without the added mass or pressure drop of typical filtration elements. In some embodiments, a bleed mass flow rate of air carrying particulate matter through the entrainment air channels can be about 1% to about 2% of the mass flow rate of air passed through the fuel cells, thereby enhancing fuel cell stack life with no additional pressure drop and very little added mass. In some embodiments, the electrostatic filters can be provided as relatively course charged screens configured to a attract larger particles with minimal pressure drop and only some added mass. This course electrostatic filter can require less maintenance than a typical paper filter element with less pressure drop and wider service intervals. In some embodiments, the electrostatic filters can be charged and/or powered by battery and/or fuel cell power with only a low power draw.

At least one embodiment is disclosed, and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . 50 percent, 51 percent, 52 percent, . . . , 95 percent, 96 percent, 95 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present invention. Also, the phrases "at least one of A, B, and C" and "A and/or B and/or C" should each be interpreted to include only A, only B, only C, or any combination of A, B, and C.

What is claimed is:

1. An unmanned aerial vehicle (UAV), comprising:
   an air-cooled fuel cell;
   an air channel comprising a forward facing opening for receiving ram air and connected to the air-cooled fuel cell; and
   a passive ram air filtration system (PRAFS) configured to filter particulate matter from ram air received into the air channel via the forward facing opening;
   wherein the air-cooled fuel cell is configured to be closed on a forward end so that ram air is prevented from entering the air-cooled fuel cell through the forward end.

2. The UAV of claim 1, wherein the PRAFS comprises an entrainment air channel in fluid communication with the air channel that comprises an entrainment air exit in communication with the environment external to the UAV.

3. The UAV of claim 2, wherein the entrainment air channel comprises a shape profile configured to increase a likelihood that particulate matter of ram air entering the air channel will enter the entrainment air channel as opposed to being introduced to the air-cooled fuel cell.

4. The UAV of claim 3, wherein the PRAFS further comprises an electrostatic filter disposed between the forward facing opening of the air channel and the air-cooled fuel cell.

5. The UAV of claim 4, wherein the electrostatic filter is disposed within the air channel.

6. The UAV of claim 1, wherein the air-cooled fuel cell and the PRAFS are disposed within a thrust module of the UAV.

7. The UAV of claim 1, wherein the PRAFS comprises an electrostatic air filter disposed between the forward facing opening and the air-cooled fuel cell.

8. A method of filtering ram air provided to a fuel cell, comprising:
   providing an air channel comprising a forward facing opening configured to receive ram air and/or rotor wash air; and
   operating a passive ram air filtration system (PRAFS) to filter particulate matter from ram;
   air received into the air channel via the forward facing opening;
   wherein the fuel cell is configured to be closed on a forward end so that ram and rotor wash air are prevented from entering the cell through the forward end.

9. The method of claim 8, wherein the PRAFS comprises an entrainment air channel in fluid communication with the air channel that comprises an entrainment air exit in communication with an environment external to an Unmanned Aerial Vehicle (UAV) and wherein the entrainment air channel comprises a shape profile configured to increase a likelihood that particulate matter of ram air entering the air channel will enter the entrainment air channel as opposed to being introduced to the air-cooled fuel cell.

10. The method of claim 9, wherein the PRAFS further comprises an electrostatic filter disposed between the forward facing opening of the air channel and the air-cooled fuel cell.

11. The method of claim 10, wherein the electrostatic filter is disposed within the air channel.

12. The method of claim 8, wherein the air-cooled fuel cell and the PRAFS are disposed within a thrust module of a UAV.

13. The method of claim 8, wherein the PRAFS comprises an electrostatic air filter disposed between the forward facing opening and the air-cooled fuel cell.

* * * * *